US005402257A

United States Patent [19]

Hasselmann et al.

[11] Patent Number: 5,402,257

[45] Date of Patent: Mar. 28, 1995

[54] METHOD AND APPARATUS FOR THE WIRELESS CONTROL OF LIFT DEVICES BY INFRARED TRANSMISSION

[75] Inventors: Heinz Hasselmann, Hagen; Anton Münzebrock, Dortmund; Peter Stehr, Hagen; Walter Voll, Hassfurt, all of Germany

[73] Assignee: Mannesmann Aktiengesellschaft, Dusseldorf, Germany

[21] Appl. No.: 865,049

[22] Filed: Apr. 8, 1992

[30] Foreign Application Priority Data

Apr. 8, 1991 [DE] Germany ........................ 41 11 736.0

[51] Int. Cl.[6] .............................................. H04B 10/00

[52] U.S. Cl. .................................... 359/144; 359/142; 359/154; 212/160; 340/825.72

[58] Field of Search ........................ 359/142, 143–144, 359/147–148, 154, 164, 165, 172; 212/160; 340/825.72, 825.31, 825.5, 825.52

[56] References Cited

U.S. PATENT DOCUMENTS

| | | | |
|---|---|---|---|
| 4,236,255 | 11/1980 | Burgener et al. | 359/143 |
| 4,430,652 | 2/1984 | Rothenbuhler et al. | 212/160 |
| 4,661,991 | 4/1987 | Logemann | 340/825.5 |
| 4,673,911 | 6/1987 | Yoshida | 359/143 |

FOREIGN PATENT DOCUMENTS

| | | | |
|---|---|---|---|
| 0231994 | 12/1984 | Japan | 359/144 |
| 2142508 | 1/1985 | United Kingdom | 359/144 |
| 2196203 | 4/1988 | United Kingdom | 359/142 |

*Primary Examiner*—Richard E. Chilcot, Jr.
*Assistant Examiner*—K. Negash
*Attorney, Agent, or Firm*—Cohen, Pontani, Lieberman, Pavane

[57] ABSTRACT

In this method and apparatus for the wireless control of a lift device and, in particular, of a traveling crane, a plurality of transmitting units communicate by infrared transmission of data telegrams to a receiving unit associated with the crane. The data telegrams include an integrated address signal that is unique to each transmitting unit and is stored in a memory module of the transmitting unit. The receiving unit decodes the data telegram and, if the crane is not then in use, stores the address signal in a comparison circuit of the receiving unit. Only subsequently-received data telegrams incorporating the stored address signal are passed to the crane for controlling the crane, thereby assuring that a user not then in control of a crane operation cannot interfere with its operation. Each transmitting unit also includes a user-operable release switch for releasing that user's control of the crane by clearing the address signal then stored in the comparison unit so as to permit control of the crane by other users through other transmitting units.

16 Claims, 1 Drawing Sheet

METHOD AND APPARATUS FOR THE WIRELESS CONTROL OF LIFT DEVICES BY INFRARED TRANSMISSION

FIELD OF THE INVENTION

The present invention relates generally to methods and apparatus for the wireless control of lift devices, such as travelling cranes by infrared transmission.

BACKGROUND OF THE INVENTION

Methods and apparatus for the wireless control of lift devices by infrared transmission are known. For example, European Unexamined Patent Application No. EP O 195 665 A2 discloses a device for the wireless control of an apparatus, and in particular through infrared transmission of control signals for the control of cranes. Specifically, the prior art control device includes a transmitting unit and a receiving unit. The transmitting unit consists essentially of function-selecting switch elements, a coder, for encoding the selected commands of the switch elements, and infrared diodes for transmitting the coded infrared signals from the transmitting unit. The infrared signals sent by the transmitting unit are received by sensors located in the receiving unit. The received signal is then decoded in a decoder and is used to control the electric loads of the crane.

In order to insure reliable operation in controlling the crane, the transmitting and receiving units continue to communicate via continuously or periodically transmitted infrared signals such that a control signal is continuously transmitted as the crane is operated. Thus, upon actuation of a switch element in the transmitting unit, a function signal corresponding to the selected crane function is sent out as an infrared signal. An interruption of the periodically or continuously transmitted function or control signal for more than a predetermined interval during operation of the crane, causes a shutdown of all crane functions. For example, a failure in the electronic system or exceeding of the range of the transmitting unit so that the receiver no longer receives the repeated-transmitted control signal leads to such a shutdown of all crane functions.

However, this prior art device has serious disadvantageous when used by several operators since the transmitting unit, which is implemented as a held transmitter, must be transported and physically handed over to the next operator, with a consequent loss of time both by the operator and of the crane's availability to perform the operations for which it is needed.

OBJECTS AND SUMMARY OF THE INVENTION

It is accordingly an object of the present invention to provide a method and apparatus for the wireless control of a lift device and, in particular, of a travelling crane. It is a particular object of the invention to provide for the control of the crane or lift device by a plurality of users regardless of their respective locations and so that only a single user is able to control the operation of the lift device at any given time. It is a further object to provide such a method and apparatus with ease and efficiency in transferring control of the lift device from one user to another.

These and other objects and features of the invention are attained by addressing a data telegram from each transmitting unit with a unique address signal deposited in a memory module of the transmitting unit and by comparing the received data telegram address in a comparison circuit of the receiving unit which recognizes and evaluates the data telegram signal, thereby assuring unambiguous association of the transmitting and receiving units. This arrangement permits alternating control of the lift device by a plurality of different transmitting units among which control of the lift device can be switched. Thus, a user of the lift device having one of a plurality of transmitting units can be control-authorized to control the lift device once the device has been placed in operation or immediately after it has been released by another user. In this way, the loss of time normally associated with physically transferring or handing over of the transmitting unit to the next operator is minimized or eliminated.

In operating the control device of the invention, it is particularly advantageous that the data telegram—which, in a preferred form of the invention, is retransmitted at relatively fixed intervals for continuity of control and, thereby, enhanced reliability—be transmitted with relatively large time intervals between the individual data telegrams. In this way, during pauses in transmission other transmitters in the area can send their data telegrams, undisturbed, to the receiving unit. Furthermore, during pauses in transmission a receiving unit can receive a data telegram from another authorized transmitting unit and send out the signal that it has thereby received as a request signal by way a signal element located on or in association with the lift device. This provides a direct indication that a user other than the one then in control of the lift device wishes to use the device. By further providing a release switch element on each transmitting unit for erasing the address signal stored in the receiving unit comparison circuit, a user then in control of the lift device can release the device after completion of his use and thereby make the lift device immediately available for control by another user having a different transmitting unit. This release may also be conditionally linked to compliance with certain predetermined conditions of the lift device such as no load on hook, or the disposition of the hook in its uppermost position.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

DETAILED DESCRIPTION OF THE DRAWING

Figure 1:
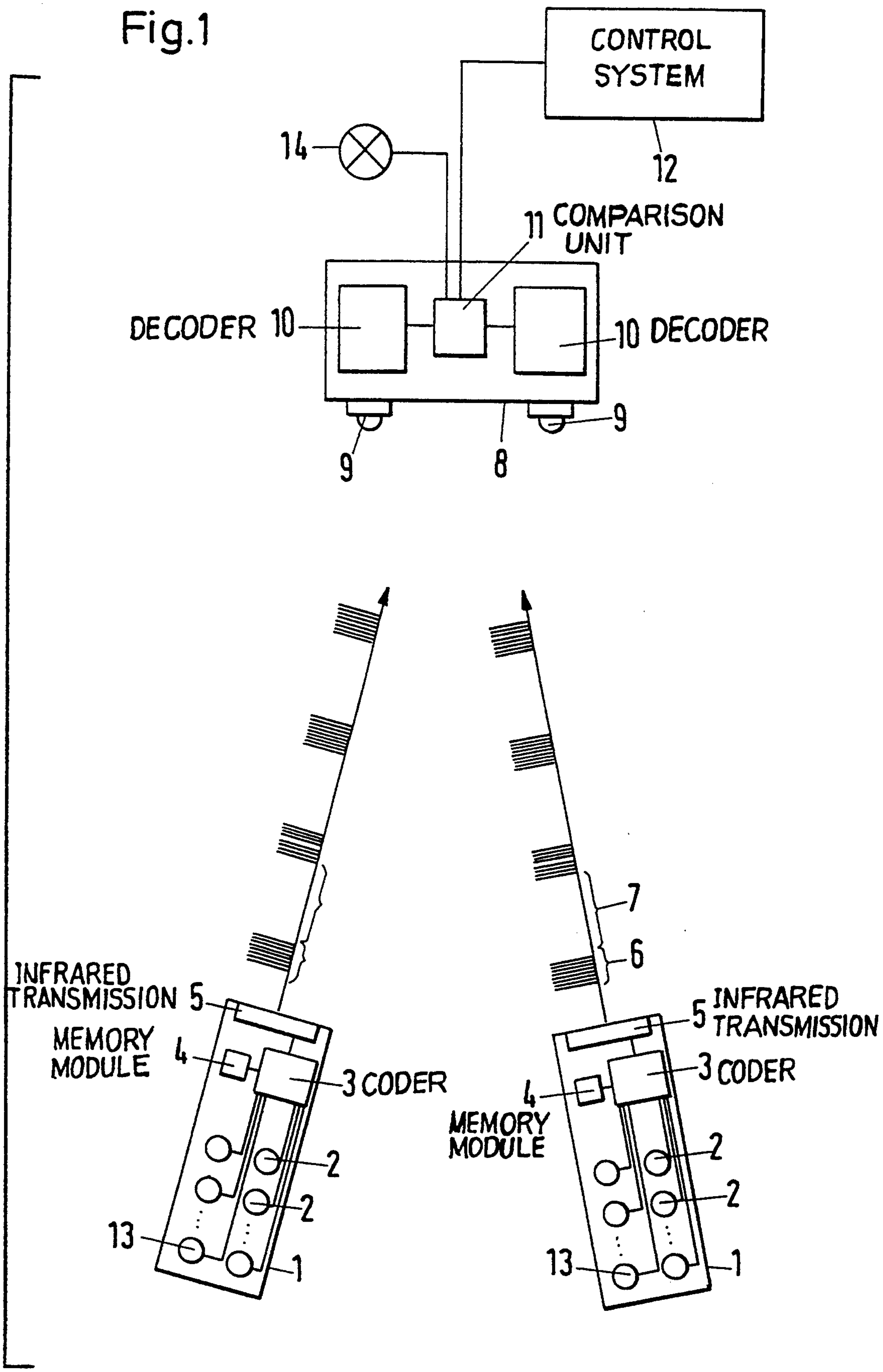

The single FIGURE of the drawing is a diagrammatic view of a wireless, infrared control device constructed in accordance with the teachings of the present invention.

DETAILED DESCRIPTION OF THE PREFERRED EMBODIMENTS

FIG. 1 diagrammatically depicts a device constructed in accordance with the present invention for the wireless control of lift devices and, in particular, of a travelling crane. Two typically hand-held control transmitters or transmitting units 1 are shown, although it is contemplated and intended that the invention be applicable to arrangements incorporating virtually any plurality of such transmitters. Each transmitting unit 1 includes a plurality of function-selecting switch elements 2 that are electrically connected to a coder 3. The coder 3 encodes the selected commands received from the user-activated switch elements 2 into a binary function signal. The binary function signal is also combined with an address signal—unique to and unambiguously identifying the particular transmitting unit—that is stored in a memory module 4 of the transmitting unit. Together, the function signal and the address signal form a unitary or integrated data telegram 6 that is transmitted by way of wireless means for infrared transmission 5, most preferably infrared diodes, to a separate and remotely disposed receiving unit 8 that is associated with the travelling crane being controlled.

Each transmitted data telegram 6 is followed by a pause 7 in transmission (i.e. so-called pulse-pause modulation), the duration of the pause 7 preferably being a predetermined multiple of the transmission time of the data telegram 6. Thus, the length or duration of the pause 7 may, by way of example, be 32 times the duration of the data telegram 6. In this manner, disturbance-free operation of a multiplicity of transmitting and receiving units within a common area is possible since the various transmitting units can send, and have received, their data telegrams during these pauses in transmission from the unit 1 then in control of the travelling crane. Additionally, the data telegrams 6 are continuously repeated, at intervals separated by the pause 7, for at least as long as the crane function initiated from the controlling transmitting unit 1 is being carried out.

The data telegram 6 sent by the transmitting means 5 of one of the transmitters 1 is received by sensors 9 located in or associated with a receiving unit 8. The unit 8 is electrically or otherwise connected to the travelling crane for controlling its operations. The data telegram 6 that is received by the sensors 9 is forwarded to a decoder 10 which decodes the data telegram 6. Two decoders 10, connected in parallel, are provided in the receiving unit 8 herein disclosed; this arrangement enables enhanced operative reliability by requiring that the outputs of the decoders 10 match before passing the operating command or function to the travelling crane. A comparison unit 11, for processing the address and function signals contained in the integrated decoded data telegram 6, is connected to the decoders 10 for receiving the outputs thereof. More specifically, the first address signal received, by way of the decoders 10, in the comparison unit 11 from any authorized transmitting unit 1 after the travelling crane has been placed in operation (or released by another use) is stored by the companion unit. A determination as to whether the crane has just been placed in operation or released by a user and, thereby, whether the crane is available to a new user, may be carried out by determining whether any address signal is currently stored in the comparison unit 11; if not, then the crane is available. This establishes the transmitting unit 1 from which the data telegram 6 has been received as the transmitter thereafter in control, to the exclusion of all other transmitting units 1, of the travelling crane through recognition and storage of its unique address signal.

The address signal 4 that has been stored in the comparison unit 11 is then compared with the next-incoming address signal, i.e. following the transmission pause interval 7. Only in the event of agreement between the next-incoming data telegram address signal, and that already stored, is the function signal portion of the data telegram released to the control system 12 of the lift device to initiate or carry out the so-identified crane function. In the event of nonagreement between the two address signals, the function signal of the data telegram is ignored. This assumes that the receiving unit 8, and the associated travelling crane, cannot be controlled by a different transmitting unit 1 then that which has already seized control of the crane. To permit another's control, the operator with the presently control-authorized transmitting unit 1—i.e. the use of the transmitting unit whose address signal is currently stored in the comparison unit 11—must first release the receiving unit 8 and crane by actuating a release switch 13 on the control-authorized transmitting unit 1 to thereby clear the address signal stored in the companion unit 11 of the receiving unit 8. Thus, actuating of the release switch 13 effects an erasure of the address signal then stored in the comparison unit 11. The first address signal which thereafter arrives at the comparison unit 11 is stored and thereby establishes the transmitting unit 1 that is uniquely identified by that address signal as control-authorized until subsequent actuation of its release switch 13. It is also within the intended scope and contemplation of the invention that all authorized address signals of the multiple transmitting units 1 be stored or prestored in the comparison unit 11 to permit comparison of each incoming address signal with those which are control-authorized as each transmitting unit 1 is used and thereby provide a measure of integrity checking of incoming signals. If the lift device is busy—i.e. in use by one user when a data telegram 6 from another user is received by the receiving device 8—a signal element 14 indicating an effort to seize control by another user and, preferably, visible to all users can be placed on or associated with the lift device.

While there have been shown and described and pointed out fundamental novel features of the invention as applied to preferred embodiments thereof, it will be understood that various omissions and substitutions and changes in the form and details of the device illustrated, and in its operation, may be made by those skilled in the art without departing from the spirit of the invention. It is the intention, therefore, to be limited only as indicated by the scope of the claims appended hereto.

What is claimed is:

1. A method for wireless remote control of a lift device from a user-controlled transmitter including user-operable means for selecting an operating command to be carried out by the lift device, comprising the steps of:

manually selecting a lift device operating command at the transmitter;

encoding the selected lift device operating command to define a function signal identifying the selected operating command, and encoding the function signal and an address signal associated with and uniquely identifying the transmitter to produce an integrated data telegram;

transmitting the data telegram from the transmitter by infrared transmission;

receiving the transmitted data telegram from the transmitter at a receiver remote from the transmitter;

decoding the data telegram received from the transmitter so as to recover the function signal and the address signal from the data telegram;

providing a data retaining means at the receiver for storing a recovered address signal; and comparing the recovered address signal from the decoded data telegram with an address signal stored in the data retaining means and (a) if no address signal is currently stored in the data retaining means, storing the recovered address signal in the data retaining means, (b) if the recovered address signal from the data telegram is the same as an address signal currently stored in the data storage means, forwarding the recovered function signal from the data telegram to the lift device for operating the lift device in accordance with the operating command of the recovered function signal, and (c) if the recovered address signal from the data telegram is different from an address signal currently stored in the data storage means, withholding forwarding of the recovered function signal from the data telegram to the lift device so as to prevent the lift device from operating in accordance with the operating command of the recovered function signal.

2. A method in accordance with claim 1, wherein said manually selecting step comprises manually selecting one of a lift device operating command and a data storage means clearing command at the transmitter, wherein said coding step further comprises coding the selected lift device operating command or data storage means clearing command to define a function signal identifying the selected operating command or clearing command, and wherein said comparing step further comprises (d) if the recovered address signal from the data telegram is the same as an address signal currently stored in the data storage means and the function signal identifies a data storage means clearing command, clearing the currently-stored address signal from the data storage means.

3. A method in accordance with claim 1, wherein said transmitting step comprises repeatedly transmitting the data telegram at predetermined intervals.

4. A method in accordance with claim 1, wherein said transmitting step comprises repeatedly transmitting the data telegram at predetermined intervals having a duration defined as a multiple of the data telegram transmission time.

5. A method in accordance with claim 1, wherein said decoding step further comprises decoding the data telegram received from the transmitter in a first decoder and in a second decoder so as to recover in each of the first and second decoders the function signal and the address signal from the received data telegram, and wherein said comparing step further comprises comparing the recovered address signals from the first and second decoders for and comparing the said recovered address signal from one of the first and second decoders with an address signal currently stored in the data retaining means only if the recovered address signals from the first and second decoders are the same.

6. Apparatus for wireless remote control of a lift device by a user, comprising:

a transmitter, comprising:

user-operable means for selecting an operating command to be carried out by the lift device;

storage means for storing an address signal associated with and uniquely identifying said transmitter;

coder means for defining a function signal from the user-selected operating command and for producing an integrated data telegram from said function signal and said transmitter-stored address signal; and means for wireless infrared transmission of the data telegram from said transmitter; and a receiver remotely disposed from said transmitter and comprising:

sensor means for receiving infrared transmissions from the transmitter;

means for decoding data telegrams received by said sensor means from the transmitter so as to recover the function signal and the address signal from each said data telegram; and comparison means, including data retaining means for storing a recovered address signal, for receiving the address signal recovered by said decoding means, for comparing each said recovered address signal from said decoding means with an address signal stored in said data retaining means, and for operating in accordance with a result of said comparison such that (a) where no address signal is currently stored in the data retaining means, storing the recovered address signal from said decoding means in the data retaining means;

(b) where the recovered address signal from a data telegram is the same as an address signal currently stored in the data storage means, forwarding the recovered function signal from the data telegram to the lift device for operating the lift device in accordance with the operating command of said recovered function signal; and (c) where the recovered address signal from a data telegram is different from an address signal currently stored in the data storage means, withholding forwarding of the recovered function signal from the data telegram to the lift device so as to prevent the lift device from operating in accordance with the operating command of said recovered function signal.

7. An apparatus in accordance with claim 6, further comprising an electrical control system associated with the lift device for receiving the recovered function signals forwarded to the lift device by said comparison means of said receiver and for effecting operations of the lift device in accordance with the operating commands of said forwarded recovered function signals.

8. An apparatus in accordance with claim 6, wherein said receiver is mounted on the lift device.

9. An apparatus in accordance with claim 6, wherein said transmitter further comprises user-actuatable means for instructing said comparison means to clear an address signal currently stored in said data retaining means, wherein said coder means is operable to define an address-clearing function signal in response to actuation of said user-actuatable means and to produce an integrated data telegram from the address-clearing function signal and the transmitter-stored address signal, and wherein said comparison means, where the recovered address signal of a data telegram is the same as an address signal currently stored in the data retaining means and the function signal of the data telegram is an address-clearing function signal, is operable to clear the currently-stored address signal from said data remaining means.

10. An apparatus in accordance with claim 6, wherein said means for infrared transmission comprises an infrared diode.

11. An apparatus in accordance with claim 6, wherein said decoding means comprises a first decoder and a second decoder, each said decoder receiving data telegrams from said sensor means and decoding each received data telegram to recover the function signal and the address signal thereof, and said comparison means being further operable for comparing the recovered address signals from said first and second decoders for each said received data telegram and for comparing the said recovered address signal from one of the first and second decoders with an address signal currently stored in said data retaining means only if the recovered address signals from the first and second decoders are the same.

12. An apparatus in accordance with claim 6, wherein said comparison means is further operable for generating a busy output signal when the result of the comparison by said comparison means of each said recovered address signal from said decoding means with an address signal stored in said data retaining means is that the recovered address signal from the data telegram is different from an address signal currently stored in the data storage means, and said apparatus further comprising indicating means operable in response to said busy output signal for providing a visible indication that the lift device is currently in use.

13. An apparatus in accordance with claim 6, wherein the lift device is a crane.

14. An apparatus in accordance with claim 6, wherein said wireless infrared transmission means comprises means for repeatedly transmitting the data telegram at predetermined intervals.

15. An apparatus in accordance with claim 14, wherein the data telegram has a transmission time, and wherein the predetermined interval has a duration defined as a predetermined multiple of said transmission time.

16. Apparatus for wireless remote control of a lift device by a plurality of users, comprising:

a first and a second transmitter, each said transmitter comprising:

user-operable means for selecting an operating command to be carried out by the lift device;

storage means for storing an address signal associated with and uniquely identifying the transmitter;

coder means for defining a function signal from the user-selected operating command and for producing an integrated data telegram from said function signal and said transmitter-stored address signal; and means for wireless infrared transmission of the data telegram from said transmitter; and a receiver remotely disposed from said first and second transmitters and comprising:

sensor means for receiving infrared transmissions from said first and second transmitters;

means for decoding data telegrams received by said sensor means from the transmitters so as to recover the function signal and the address signal from each said data telegram; and comparison means, including data retaining means for storing a recovered address signal, for receiving the address signal recovered by said decoding means, for comparing each said recovered address signal from said decoding means with an address signal stored in said data retaining means, and for operating in accordance with a result of said comparison such that (a) where no address signal is currently stored in the data retaining means, storing the recovered address signal from said decoding means in the data retaining means;

(b) where the recovered address signal from a data telegram is the same as an address signal currently stored in the data storage means, forwarding the recovered function signal from the data telegram to the lift device for operating the lift device in accordance with the operating command of said recovered function signal; and (c) where the recovered address signal from a data telegram is different from an address signal currently stored in the data storage means, withholding forwarding of the recovered function signal from the data telegram from the lift device so as to prevent the lift device from operating in accordance with the operating command of said recovered function signal.

* * * * *